(12) United States Patent
Jones (10) Patent No.: US 7,320,252 B2
(45) Date of Patent: *Jan. 22, 2008

(54) FLOW METER USING AN EXPANDED TUBE SECTION AND SENSITIVE DIFFERENTIAL PRESSURE MEASUREMENT

(75) Inventor: Richard T. Jones, Hamden, CT (US)

(73) Assignee: Weatherford/Lamb, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/532,995

(22) Filed: Sep. 19, 2006

(65) Prior Publication Data

US 2007/0062307 A1    Mar. 22, 2007
US 2007/0272033 A9    Nov. 29, 2007

Related U.S. Application Data

(63) Continuation of application No. 11/168,819, filed on Jun. 28, 2005, now Pat. No. 7,107,860, which is a continuation of application No. 10/647,014, filed on Aug. 22, 2003, now Pat. No. 6,910,388.

(51) Int. Cl.
*G01F 1/44* (2006.01)
(52) U.S. Cl. .................. 73/861.63; 73/861.64
(58) Field of Classification Search ............. 73/861.63, 73/861.52
See application file for complete search history.

(56) References Cited

U.S. PATENT DOCUMENTS 2,420,148 A    5/1947    Ostergren
3,149,492 A    9/1964    Weinberg
3,851,521 A    12/1974   Ottenstein
4,080,837 A    3/1978    Alexander
4,114,439 A    9/1978    Fick
4,144,768 A    3/1979    Andersson
4,159,646 A    7/1979    Paulsen
4,164,865 A    8/1979    Hall
4,207,551 A    6/1980    Kautzky
4,236,406 A    12/1980   Reed
4,275,602 A    6/1981    Fujishiro
4,445,389 A    5/1984    Potzick
4,499,418 A    2/1985    Helms et al.
4,515,473 A    5/1985    Mermelstein (Continued)

FOREIGN PATENT DOCUMENTS

DE    19511234    12/1995

(Continued)

OTHER PUBLICATIONS

GB Examination and Search Report, Application No. 0624422.2, Dated Jan. 12, 2007.

(Continued)

*Primary Examiner*—Harshad Patel
(74) *Attorney, Agent, or Firm*—Patterson & Sheridan, L.L.P.

(57) ABSTRACT

A method and apparatus for measuring the flow rate of a fluid within tubing disposed within a downhole wellbore. The present invention provides an inverse Venturi meter inserted within tubing with an enlarged inner diameter portion. Pressure differential is measured between the enlarged inner diameter portion and another portion of the inverse Venturi meter. Flow rate is determined from the pressure differential and the density of the fluid.

19 Claims, 4 Drawing Sheets

U.S. PATENT DOCUMENTS

| | | |
|---|---|---|
| 4,520,320 A | 5/1985 | Potzick |
| 4,546,649 A | 10/1985 | Kantor |
| 4,706,501 A | 11/1987 | Atkinson |
| 4,788,852 A | 12/1988 | Martin |
| 4,813,270 A | 3/1989 | Baillie |
| 4,856,344 A | 8/1989 | Hunt |
| 4,858,474 A | 8/1989 | Glasheen et al. |
| 4,862,750 A | 9/1989 | Nice |
| 4,864,848 A | 9/1989 | Irvine |
| 4,864,868 A | 9/1989 | Khalifa |
| 4,884,457 A | 12/1989 | Hatton |
| 4,896,540 A | 1/1990 | Shakkottai |
| 4,932,262 A | 6/1990 | Wlodarczyk |
| 4,947,127 A | 8/1990 | Helms |
| 4,950,883 A | 8/1990 | Glenn |
| 4,976,151 A | 12/1990 | Morishita |
| 4,978,863 A | 12/1990 | Lyons et al. |
| 4,996,419 A | 2/1991 | Morey |
| 5,024,099 A | 6/1991 | Lee |
| 5,031,460 A | 7/1991 | Kanenobu |
| 5,040,415 A | 8/1991 | Barkhoudarian |
| 5,051,922 A | 9/1991 | Toral |
| 5,058,437 A | 10/1991 | Chaumont |
| 5,083,452 A | 1/1992 | Hope |
| 5,099,697 A | 3/1992 | Agar |
| 5,115,670 A | 5/1992 | Shen |
| 5,152,181 A | 10/1992 | Lew |
| 5,207,107 A | 5/1993 | Wolf |
| 5,218,197 A | 6/1993 | Carroll |
| 5,317,576 A | 5/1994 | Leonberger |
| 5,321,991 A | 6/1994 | Kalotay |
| 5,347,873 A | 9/1994 | Vander Heyden |
| 5,361,130 A | 11/1994 | Kersey |
| 5,363,342 A | 11/1994 | Layton |
| 5,367,911 A | 11/1994 | Jewell |
| 5,372,046 A | 12/1994 | Kleven et al. |
| 5,398,542 A | 3/1995 | Vasbinder |
| 5,401,956 A | 3/1995 | Dunphy |
| 5,426,297 A | 6/1995 | Dunphy |
| 5,440,932 A | 8/1995 | Wareham |
| 5,442,964 A * | 8/1995 | Coates et al. ............ 73/862.68 |
| 5,493,390 A | 2/1996 | Varasi |
| 5,493,512 A | 2/1996 | Peube |
| 5,513,913 A | 5/1996 | Ball |
| 5,564,832 A | 10/1996 | Ball |
| 5,576,497 A | 11/1996 | Vignos |
| 5,591,922 A | 1/1997 | Segeral et al. |
| 5,597,961 A | 1/1997 | Marrelli |
| 5,639,667 A | 6/1997 | Heslot |
| 5,642,098 A | 6/1997 | Santa Maria |
| 5,644,093 A | 7/1997 | Wright |
| 5,654,551 A | 8/1997 | Watt |
| 5,670,720 A | 9/1997 | Clark |
| 5,680,489 A | 10/1997 | Kersey |
| 5,689,540 A | 11/1997 | Stephenson |
| 5,708,211 A | 1/1998 | Jepson |
| 5,730,219 A | 3/1998 | Tubel |
| 5,732,776 A | 3/1998 | Tubel |
| 5,736,650 A | 4/1998 | Hiron et al. |
| 5,741,980 A | 4/1998 | Hill |
| 5,803,167 A | 9/1998 | Bussear |
| 5,804,713 A | 9/1998 | Kluth |
| 5,808,188 A | 9/1998 | Chriswell |
| 5,842,347 A | 12/1998 | Kinder |
| 5,842,374 A | 12/1998 | Chang |
| 5,845,033 A | 12/1998 | Berthold |
| 5,892,860 A | 4/1999 | Maron et al. |
| 5,906,238 A | 5/1999 | Carmody |
| 5,907,104 A | 5/1999 | Cage |
| 5,908,990 A | 6/1999 | Cummings |
| 5,925,821 A | 7/1999 | Bousquet |
| 5,925,879 A | 7/1999 | Hay |
| 5,939,643 A | 8/1999 | Oertel |
| 5,956,132 A | 9/1999 | Donzier |
| 5,959,547 A | 9/1999 | Tubel |
| 5,963,880 A | 10/1999 | Smith |
| 5,975,204 A | 11/1999 | Tubel |
| 5,992,519 A | 11/1999 | Ramakrishnan |
| 5,996,690 A | 12/1999 | Shaw |
| 6,002,985 A | 12/1999 | Stephenson |
| 6,003,383 A | 12/1999 | Zielinska |
| 6,003,385 A | 12/1999 | De Vanssay |
| 6,009,216 A | 12/1999 | Pruett |
| 6,016,702 A | 1/2000 | Maron |
| 6,158,288 A | 12/2000 | Smith |
| 6,216,532 B1 | 4/2001 | Stephenson |
| 6,233,374 B1 | 5/2001 | Ogle |
| 6,279,660 B1 | 8/2001 | Hay |
| 6,354,147 B1 | 3/2002 | Gysling et al. |
| 6,405,604 B1 | 6/2002 | Berard et al. |
| 6,463,813 B1 * | 10/2002 | Gysling ................... 73/862.59 |
| 6,536,291 B1 | 3/2003 | Gysling |
| 6,601,458 B1 | 8/2003 | Gysling et al. |
| 6,612,187 B1 | 9/2003 | Lund |
| 6,691,584 B2 | 2/2004 | Gysling et al. |
| 6,698,297 B2 | 3/2004 | Gysling |
| 6,782,150 B2 | 8/2004 | Davis et al. |
| 6,813,962 B2 | 11/2004 | Gysling et al. |
| 6,898,986 B2 | 5/2005 | Daniel et al. |
| 6,910,388 B2 * | 6/2005 | Jones ..................... 73/861.63 |
| 6,912,895 B1 | 7/2005 | Jaeger |
| 6,945,095 B2 | 9/2005 | Johansen |
| 6,971,259 B2 | 12/2005 | Gysling |
| 7,047,816 B2 | 5/2006 | Jones et al. |
| 7,107,860 B2 * | 9/2006 | Jones ..................... 73/861.63 |

FOREIGN PATENT DOCUMENTS

| | | |
|---|---|---|
| EP | 0684458 A2 | 11/1995 |
| FR | 2357868 | 2/1978 |
| GB | 1210710 | 10/1970 |
| GB | 1247693 | 9/1971 |
| GB | 2330660 A | 4/1999 |
| JP | 6147947 | 5/1994 |
| WO | WO-93/14382 A1 | 7/1993 |
| WO | WO-96/04528 A1 | 2/1996 |
| WO | WO-00/00793 A1 | 1/2000 |

OTHER PUBLICATIONS

U.K. Search Report dated Jan. 20, 2005.

* cited by examiner

FLOW METER USING AN EXPANDED TUBE SECTION AND SENSITIVE DIFFERENTIAL PRESSURE MEASUREMENT

CROSS-REFERENCE TO RELATED APPLICATIONS

This application is a continuation of U.S. patent application Ser. No. 11/168,819, filed Jun. 28, 2005, now U.S. Pat. No. 7,107,860, which is a continuation of U.S. patent application Ser. No. 10/647,014, filed Aug. 22, 2003, now U.S. Pat. No. 6,910,388. Each of the aforementioned related patent applications is herein incorporated by reference in its entirety.

BACKGROUND OF THE INVENTION

1. Field of the Invention

Embodiments of the present invention generally relate to downhole production operations conducted within a wellbore. More specifically, embodiments of the present invention relate to measuring flow rates downhole.

2. Description of the Related Art

In the drilling of oil and gas wells, a wellbore is formed using a drill bit that is urged downwardly at a lower end of a drill string. When the well is drilled to a first designated depth, a first string of casing is run into the wellbore. The first string of casing is hung from the surface, and then cement is circulated into the annulus behind the casing. Typically, the well is drilled to a second designated depth after the first string of casing is set in the wellbore. A second string of casing, or liner, is run into the wellbore to the second designated depth. This process may be repeated with additional liner strings until the well has been drilled to total depth. In this manner, wells are typically formed with two or more strings of casing having an ever-decreasing diameter.

After a well has been drilled, it is desirable to provide a flow path for hydrocarbons from the surrounding formation into the newly formed wellbore to allow for hydrocarbon production. Therefore, after all of the casing has been set, perforations are shot through a wall of the liner string at a depth which equates to the anticipated depth of hydrocarbons. Alternatively, a liner having pre-formed slots may be run into the hole as casing. Alternatively still, a lower portion of the wellbore may remain uncased so that the formation and fluids residing therein remain exposed to the wellbore.

During the life of a producing hydrocarbon well, real-time, downhole flow data regarding the flow rate of the hydrocarbons from the formation is of significant value for production optimization. The flow rate information is especially useful in allocating production from individual production zones, as well as identifying which portions of the well are contributing to hydrocarbon flow. Flow rate data may also prove useful in locating a problem area within the well during production. Real-time flow data conducted during production of hydrocarbons within a well allows determination of flow characteristics of the hydrocarbons without need for intervention. Furthermore, real-time downhole flow data may reduce the need for surface well tests and associated equipment, such as a surface test separator, thereby reducing production costs.

Figure 1:
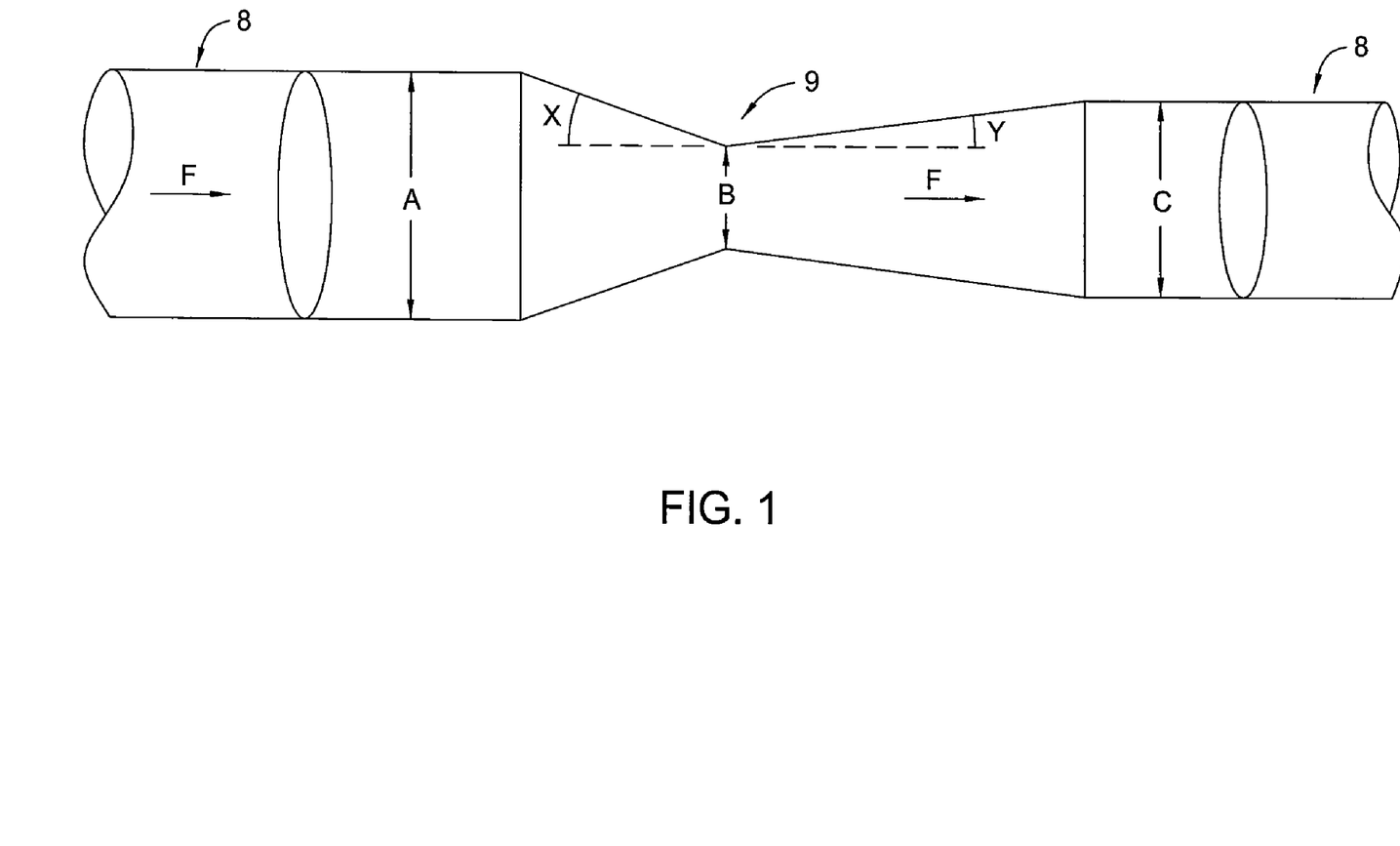
FIG. 1 is a sectional view of a typical downhole Venturi meter inserted within a string of production tubing.

Downhole flow rate data is often gathered by use of a Venturi meter. The Venturi meter is used to measure differential pressure of the hydrocarbon fluid across a constricted cross-sectional area portion of the Venturi meter, then the differential pressure is correlated with a known density of the hydrocarbon fluid to determine flow rate of the hydrocarbon mixture. FIG. 1 depicts a typical Venturi meter 9. The Venturi meter 9 is typically inserted into a production tubing string 8 at the point at which the flow rate data is desired to be obtained. Hydrocarbon fluid flow F exists through the production tubing string 8, which includes the Venturi meter 9, as shown in FIG. 1. The Venturi meter 9 has an inner diameter A at an end (point A), which is commensurate with the inner diameter of the production tubing string 8, then the inner diameter decreases at an angle X to an inner diameter B (at point B). Diameter B, the most constricted portion of the Venturi meter 9 typically termed the "throat", is downstream according to fluid flow F from the end having diameter A. The Venturi meter 9 then increases in inner diameter downstream from diameter B as the inner diameter increases at angle Y to an inner diameter C (typically approximately equal to A) again commensurate with the production tubing string 8 inner diameter at an opposite end of the Venturi meter 9.

Angle X, which typically ranges from 15-20 degrees, is usually greater than angle Y, which typically ranges from 5-7 degrees. In this way, the fluid F is accelerated by passage through the converging cone of angle X, then the fluid F is retarded in the cone increasing by the smaller angle Y. The pressure of the fluid F is measured at diameter A at the upstream end of the Venturi meter 9, and the pressure of the fluid F is also measured at diameter B of the throat of the Venturi meter 9, and the difference in pressures is used along with density to determine the flow rate of the hydrocarbon fluid F through the Venturi meter 9.

In conventional Venturi meters used in downhole applications, diameter A is larger than diameter B. Typically, diameter A is much larger than diameter B to ensure a large differential pressure between points A and B. This large differential pressure is often required because the equipment typically used to measure the difference in pressure between the fluid F at diameter A and the fluid F at diameter B is not sensitive enough to detect small differential pressures between fluid F flowing through diameter A and through diameter B. The extent of convergence of the inner diameter of the Venturi meter typically required to create a measurable differential pressure significantly reduces the available cross-sectional area through the production tubing string 8 at diameter B. Reducing the cross-sectional area of the production tubing string 8 to any extent to obtain differential pressure measurements is disadvantageous because the available area through which hydrocarbons may be produced to the surface is reduced, thus affecting production rates and, consequently, reducing profitability of the hydrocarbon well. Furthermore, reducing the cross-sectional area of the production tubing string with the currently used Venturi meter limits the outer diameter of downhole tools which may be utilized during production and/or intervention operations during the life of the well, possibly preventing the use of a necessary or desired downhole tool.

Venturi flow meters suffer from additional disadvantages to restricted access below the device (which may prevent the running of tools below the device) and reduced hydrocarbon flow rate. Venturi meters currently used cause significant pressure loss due to the restrictive nature of the devices. Further, because these devices restrict flow of the mixture within the tubing string, loss of calibration is likely due to erosion and/or accumulation of deposits (e.g., of wax, asphaltenes, etc.). These disadvantages may be compounded by poor resolution and accuracy of pressure sensors used to measure the pressure differences. Overcoming the poor resolution and accuracy may require the use of high contraction ratio (e.g., more restrictive) Venturi meters, thus further disadvantageously restricting the available cross-sectional area for hydrocarbon fluid flow and lowering downhole tools.

Therefore, it is desirable to provide a downhole flow meter within production tubing and other tubing strings through which fluid flows downhole within a wellbore which does not restrict the cross-sectional area available for production of hydrocarbons through the production tubing or fluid flow through other tubing. It is desirable to provide a downhole flow meter that measures flow rates within production tubing without causing a restriction in production tubing diameter. It is further desirable to provide a method of measuring downhole flow rate of hydrocarbons without restricting production of hydrocarbons or the types of tools which may be used downhole below the flow meter.

SUMMARY OF THE INVENTION

The present invention generally provides apparatus and methods for determining a flow rate of fluid within a pipe. In one aspect, the present invention includes a method of determining a flow rate of fluid flowing within a pipe, comprising providing a pipe, at least a portion of the pipe having a larger inner diameter than a nominal inner diameter of the pipe, wherein the pipe diverges from the nominal inner diameter of the pipe to the larger inner diameter of the pipe in the direction of fluid flow; measuring a differential pressure between at least two locations along the pipe, at least one location positioned in the portion having an inner diameter greater than the nominal inner diameter of the pipe; and determining a flow rate for the fluid based on the measured differential pressure. In another aspect, the present invention includes a method for determining the flow rate of fluid through downhole tubing, comprising providing an enlarged inner diameter portion of the downhole tubing disposed upstream of a remaining portion of the tubing; measuring a pressure differential between the enlarged inner diameter portion of the tubing and the remaining portion of the tubing; and determining the flow rate of the fluid using the pressure differential.

Further, the present invention provides in another aspect an apparatus for measuring a flow rate of a fluid flowing in a pipe disposed in a wellbore, comprising at least one differential pressure sensor disposed along the pipe across two locations for sensing differential pressure along the pipe, wherein at least one of the locations is at an enlarged inner diameter portion of the pipe, and wherein the pipe diverges from a nominal inner diameter of the pipe to the enlarged inner diameter of the pipe in the direction of fluid flow; processing equipment for converting the differential pressure to flow rate data; and one or more transmission lines for communicating differential pressure information from the at least one differential pressure sensor to the processing equipment.

In yet another aspect, the present invention includes an apparatus for measuring flow rate of fluid within a wellbore, comprising a tubing string having a diverging inner diameter portion positioned upstream of a section of the tubing string, wherein the tubing string is disposed within the wellbore; and a differential pressure sensor disposed on the tubing string and the diverging inner diameter portion for measuring a difference between fluid pressure in the tubing string and fluid pressure in the diverging inner diameter portion. Finally, in yet another aspect, the present invention provides a flow meter for use in measuring fluid flow within a downhole wellbore, comprising first and second portions, each having substantially the same inner diameter; and a middle portion, an inner diameter of the middle portion diverging outward toward the wellbore from the first and second portions, wherein a difference in fluid pressure is measurable between the middle portion and the first or second portion.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

As described below, the present invention involves an "inverse Venturi meter" or "inverse Venturi flow meter", meaning that instead of the typical constricted, converging inner diameter portion at the throat characteristic of typical Venturi meters, the inverse Venturi meter includes a flow meter with an enlarged, diverging inner diameter portion at the "throat". By utilizing an ultra-sensitive differential pressure measurement device along with an inverse Venturi meter, the present invention allows downhole flow rate measurements to be obtained without restricting the inner diameter of production tubing. The present invention thus advantageously increases the cross-sectional area available for flow of hydrocarbon fluid through the production tubing during production operations or for the flow of other fluid during completion or intervention operations. Furthermore, the present invention increases the available diameter through which downhole tools may be lowered within the tubing disposed in a wellbore when using a Venturi meter.

As used herein, the terms "tubing string" and "pipe" refer to any conduit for carrying fluid. Although the description below relates to a production tubing string, a tubing string utilized for any purpose, including intervention and completion operations, may employ the apparatus of the present invention to determine fluid flow rate. Fluid is defined as a liquid or a gas or a mixture of liquid or gas. To facilitate understanding, embodiments are described below in reference to measuring hydrocarbon fluid parameters, but it is contemplated that any fluid may be measured by the below-described apparatus and methods.

Figure 2:
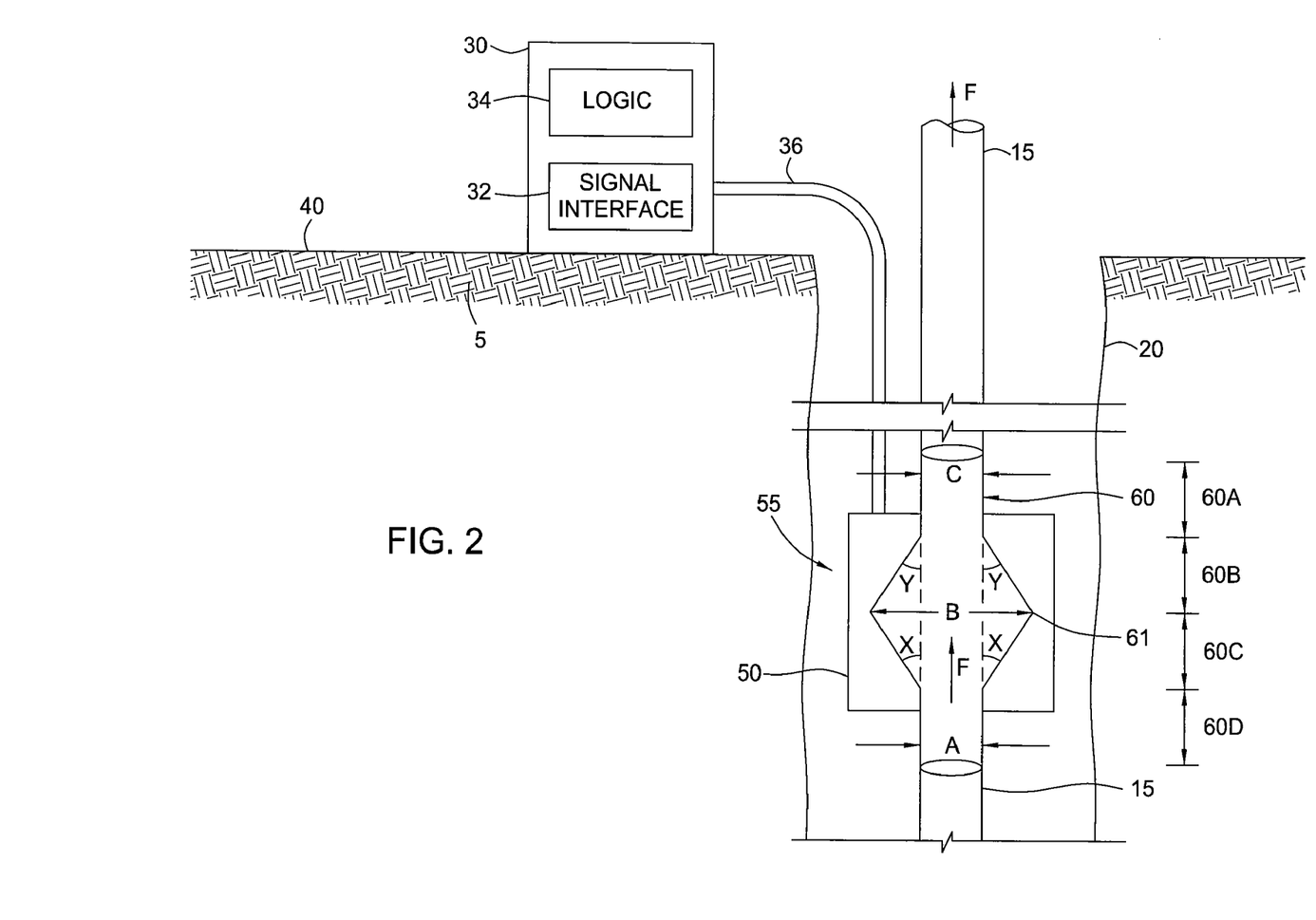
FIG. 2 is a sectional view of an exemplary flow rate measurement system including a flow meter according to an embodiment of the present invention. A differential pressure sensor measures pressure across the flow meter.

FIG. 2 shows an exemplary downhole flow rate measurement system 55 for obtaining measurements of flow rates of fluid F produced from a surrounding formation 5. (The flow rate measurement system 55 may also be used to measure the flow rates of other types of fluids flowing through a pipe for any purpose.) A flow meter (also "inverse Venturi meter") 60 is disposed within a production tubing string 15, preferably threadedly connected at each end to a portion of the production tubing string 15, so that the inverse Venturi meter 60 is in fluid communication with the production tubing string 15. Fluid F flows from downhole within a production zone (not shown) in the formation 5 to a surface 40 of a wellbore 20, as indicated by the arrow shown in FIG. 2.

As shown in FIG. 2, the inverse Venturi meter 60 includes a tubular-shaped body with four portions 60A, 60B, 60C, and 60D. The lower portion 60D has a diameter A which is capable of mating with the portion of the tubing string 15 below the inverse Venturi meter 60. The lower middle portion 60C of the inverse Venturi meter 60, located above the lower portion 60D, gradually increases in diameter at a divergence angle X to a diameter B which exists at a throat 61 of the inverse Venturi meter 60. The throat 61 represents the maximum diameter B of the inverse Venturi meter 60. The diameter of the inverse Venturi meter 60 diverges outward from diameter A (the nominal pipe diameter) to the throat 61.

Now referring to the remaining portions 60A and 60B of the inverse Venturi meter 60, the upper portion 60A is of a diameter C which is capable of mating with the portion of the tubing string 15 above the inverse Venturi meter 60. Located below the upper portion 60A is the upper middle portion 60B. In the upper middle portion 60B, the diameter of the inverse Venturi meter 60 increases in diameter at a divergence angle Y until reaching the throat 61 at diameter B. In addition to representing the maximum diameter B of the Venturi meter 60, the throat 61 also is the point at which the upper middle portion 60B and the lower middle portion 60C meet.

The increase in diameter from diameter A and/or C to diameter B is minimal in comparison to the diameters A and C, in one embodiment most preferably an increase in diameter of approximately 0.25 inches. The goal is to maximize the available area within the production tubing 15 and the inverse Venturi meter 60 with respect to the inner diameter of the wellbore 20. Accordingly, taking into account the available diameter within the wellbore 20, an increase in diameter of the tubing string 15 at diameter B which is too large would unnecessarily restrict the inner diameter of the remainder of the tubing string 15 with respect to the size of the wellbore 20, decreasing hydrocarbon fluid flow and the area through which tools may be lowered into the production tubing 15. Exemplary, but not limiting, embodiments have a nominal diameter A and/or C of 3.5 inches, 4.5 inches, or 5.5 inches, with a throat 61 diameter B of 3.7, 4.7, or 5.6 inches, respectively, depending upon the diameter of the ends of the production tubing string 15 with which the inverse Venturi meter 60 is intended to mate. Most preferably, in an embodiment of the present invention, diameter A and/or C is about 3.5 inches, while diameter B is about 3.75 inches. Diameter A and diameter C may be the same or different diameters, depending upon the diameter of the ends of the production tubing string 15 with which the inverse Venturi meter 60 is intended to mate. Angles X and Y may be any angles which produce a measurable differential pressure between the throat 61 and diameter A. The angles X and Y and the lengths of the diverging sections 60B and 60C are determined such that a satisfactory Reynolds number is achieved in the flow range of interest. The angles X and Y shown in FIG. 2 are exaggerated for illustration purposes; ideally, although not limiting the range of angles contemplated, the angles are small to provide the maximum tubing string 15 diameter and diameters A and/or C through which tools may be inserted and through which fluid F may flow (taking into account the size of the wellbore 20).

Disposed on the outer diameter of the inverse Venturi meter 60 and coupled to the pipe is a differential pressure sensor 50. The differential pressure sensor 50 has pressure ports leading to the throat 61 and to diameter A (or diameter C) so that it can detect the difference in pressure between diameter A (or diameter C) and the throat 61. The differential pressure sensor 50 may include any suitable high resolution or ultra-sensitive differential pressure sensor, including a fiber optic or optical differential pressure sensor (see FIG. 4). A suitable differential pressure sensor 50 is capable of measuring a difference in pressure between fluid F flowing through diameter A and fluid flowing through the throat 61.

Operatively connected to the differential pressure sensor 50 is at least one signal line or cable 36 or optical waveguides. The signal line 36 runs outside the tubing string 15 to the surface 40, where it connects at the opposite end to surface control circuitry 30. The control circuitry 30 may include any suitable circuitry responsive to signals generated by the differential pressure sensor 50. As illustrated, the control circuitry 30 includes signal interface circuitry 32 and logic circuitry 34. The signal interface circuitry 32 may include any suitable circuitry to receive signals from the differential pressure sensor 50 via one or more signal lines 36 and properly condition the signals (e.g., convert the signals to a format readable by the logic circuitry 34).

The logic circuitry 34 may include any suitable circuitry and processing equipment necessary to perform operations described herein. For example, the logic circuitry 34 may include any combination of dedicated processors, dedicated computers, embedded controllers, general purpose computers, programmable logic controllers, and the like. Accordingly, the logic circuitry 34 may be configured to perform operations described herein by standard programming means (e.g., executable software and/or firmware).

The signals generated by the inverse Venturi meter 60 may be any suitable combination of signals, such as electrical signals, optical signals, or pneumatic signals. Accordingly, the signal lines 36 may be any combination of signal bearing lines, such as electrically conductive lines, optical fibers, or pneumatic lines. Of course, an exact number and type of signal lines 36 will depend on a specific implementation of the inverse Venturi meter 60.

In operation, the inverse Venturi meter 60 is inserted into the production tubing 15 as shown in FIG. 2. The production tubing 15 along with the inverse Venturi meter 60 is lowered into the drilled out wellbore 20. The signal line(s) 36 may be connected to the differential pressure sensor 50 prior to or after inserting the inverse Venturi meter 60 into the wellbore 20. After flow F is introduced into the tubing string 15 from the formation 5, it flows upward into the inverse Venturi meter 60. The differential pressure sensor 50 measures the pressure difference from diameter A to the throat 61 in real time as the fluid F passes the throat 61.

The pressure difference from the throat 61 to diameter A is relayed to the surface 40 through the signal line(s) 36. The control circuitry 30 then converts the signal from the signal line(s) to meaningful flow rate data. To obtain the flow rate of the fluid F, the density of the fluid must be known. "Density" generally refers to volumetric density and is defined as a mass of a fluid contained within a volume divided by the volume. Density of the fluid F may be obtained by any known method. Suitable methods include, but are not limited to, measuring a density of the fluid F after it reaches the surface by known methods as well as measuring a density of the fluid downhole by, for example, including an absolute pressure sensor and an absolute temperature sensor along the inverse Venturi meter 60 and coupling the sensors to the pipe (formulating a density meter) and including suitable surface processing equipment as described in co-pending U.S. patent application Ser. No. 10/348,040, entitled "Non-Intrusive Multiphase Flow Meter," filed on Jan. 21, 2003, which is herein incorporated by reference in its entirety.

The control circuitry 30 uses the density and the pressure differential to determine the flow rate of the fluid F. The equation utilized to determine the flow rate of the fluid F of a given density with A and B is the following:

$$Q = \sqrt{\frac{2}{\rho} \times DP \times \frac{\pi}{4} \times [D_B^2 - D_A^2]},$$

where Q=flow rate, ρ=density of the fluid F, DP=minimum measurable pressure differential, $D_B$=the largest diameter or the expanded diameter of the inverse Venturi meter 60 (diameter B at the throat 61), and $D_A$=the smaller diameter of the inverse Venturi meter 60 upstream of the throat 61 (diameter A, or the nominal pipe size of the Venturi meter tubing). $D_A$ may also be the smaller diameter C (or nominal pipe size) of the inverse Venturi meter 60 downstream of the throat 61, depending upon at which point on the inverse Venturi meter 60 the differential pressure sensor is located. When using the most preferable embodiment of the inverse Venturi meter 60 mentioned above, which is merely exemplary and not limiting, assuming no elevation of the inverse Venturi meter 60 and a fluid density of 0.85 g/cm³, the lowest measurable flow rate would be 0.08 feet/second for a differential pressure sensor 50 having a minimum differential pressure, or differential pressure resolution, of 0.001 psid.

Figure 3:
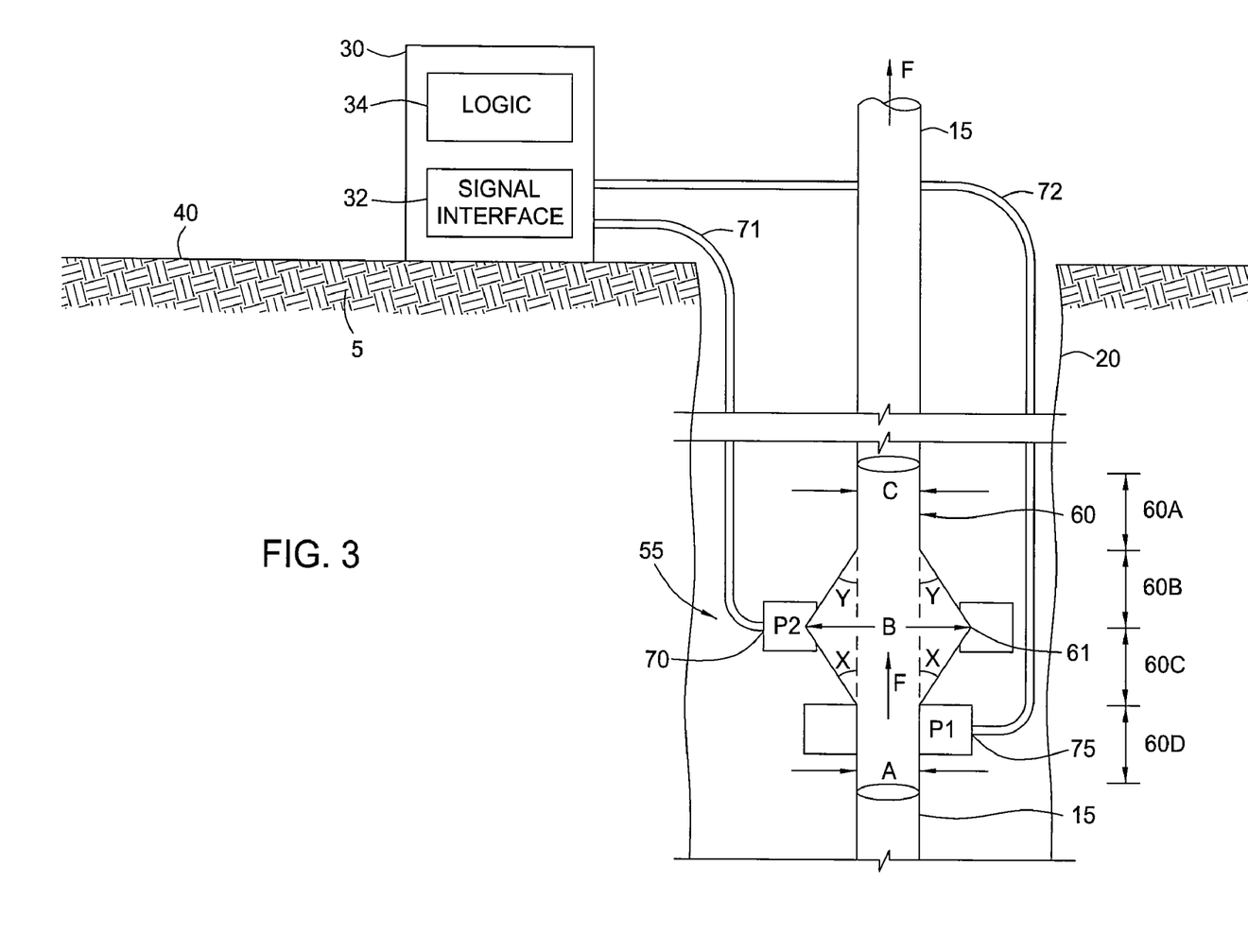
FIG. 3 is a sectional view of an alternate embodiment of the flow rate measurement system of the present invention. Two absolute pressure sensors measure pressure at two locations across the flow meter.

FIG. 3 shows a further alternate embodiment of the present invention. Like parts are labeled with like numbers to FIG. 2. Instead of a single differential pressure sensor 50, an upper absolute pressure sensor 70 is located at the throat 61, while a lower absolute pressure sensor 75 is located at portion 60D of the inverse Venturi meter having diameter A. The sensors 75 and 70 are coupled to the pipe. The upper and lower absolute pressure sensors 70 and 75 are high resolution sensors so that pressure may be detected at each location to a high precision so that a differential pressure results when the pressures are subtracted from one another at the surface. The upper pressure sensor 70 is connected by a signal line or cable 71 or optical waveguides to the control circuitry 30, and the lower pressure sensor 75 is likewise connected by a signal line or cable 72 or optical waveguides to the control circuitry 30. Alternatively, the sensors 70 and 75 may be connected to a single common signal line or cable (multiplexed).

In operation, each of the upper pressure sensor 70 and the lower pressure sensor 75 determine a pressure of the fluid F at locations near the throat 61 as well as near the portion 60D of diameter A. The upper pressure sensor 70 sends the pressure information from its location with a signal through signal line 71. The lower pressure sensor 75 sends the pressure information from its location with a signal through signal line 72. The control circuitry 30 then subtracts the two pressure measurements to determine the differential pressure and uses the density of the fluid with the determined differential pressure to calculate flow rate at a location using the same equation disclosed above in relation to FIG. 2.

Regardless of the particular arrangement, the differential pressure sensors 50 or absolute pressure sensors 70 and 75 may be any combination of suitable sensors with sufficient sensitivity to achieve the desired resolution (preferably 0.001 psid). As an example, the pressure sensors 50, 70, 75 may be any suitable type of ultra-sensitive strain sensors, quartz sensors, piezoelectric sensors, etc. Due to harsh operating conditions (e.g., elevated temperatures, pressures, mechanical shock, and vibration) that may exist downhole, however, accuracy and resolution of conventional electronic sensors may degrade over time.

Fiber optic sensors or optical sensors offer one alternative to conventional electronic sensors. Typically, fiber optic sensors have no downhole electronics or moving parts and, therefore, may be exposed to harsh downhole operating conditions without the typical loss of performance exhibited by electronic sensors. Additionally, fiber optic sensors are more sensitive than traditional sensors, which allows detection of the relatively small pressure differential produced by the inverse Venturi meter 60 of the present invention. Accordingly, for some embodiments, one or more of the sensors 50, 70, 75 utilized in the inverse Venturi meter 60 may be fiber optic sensors.

Figure 4:
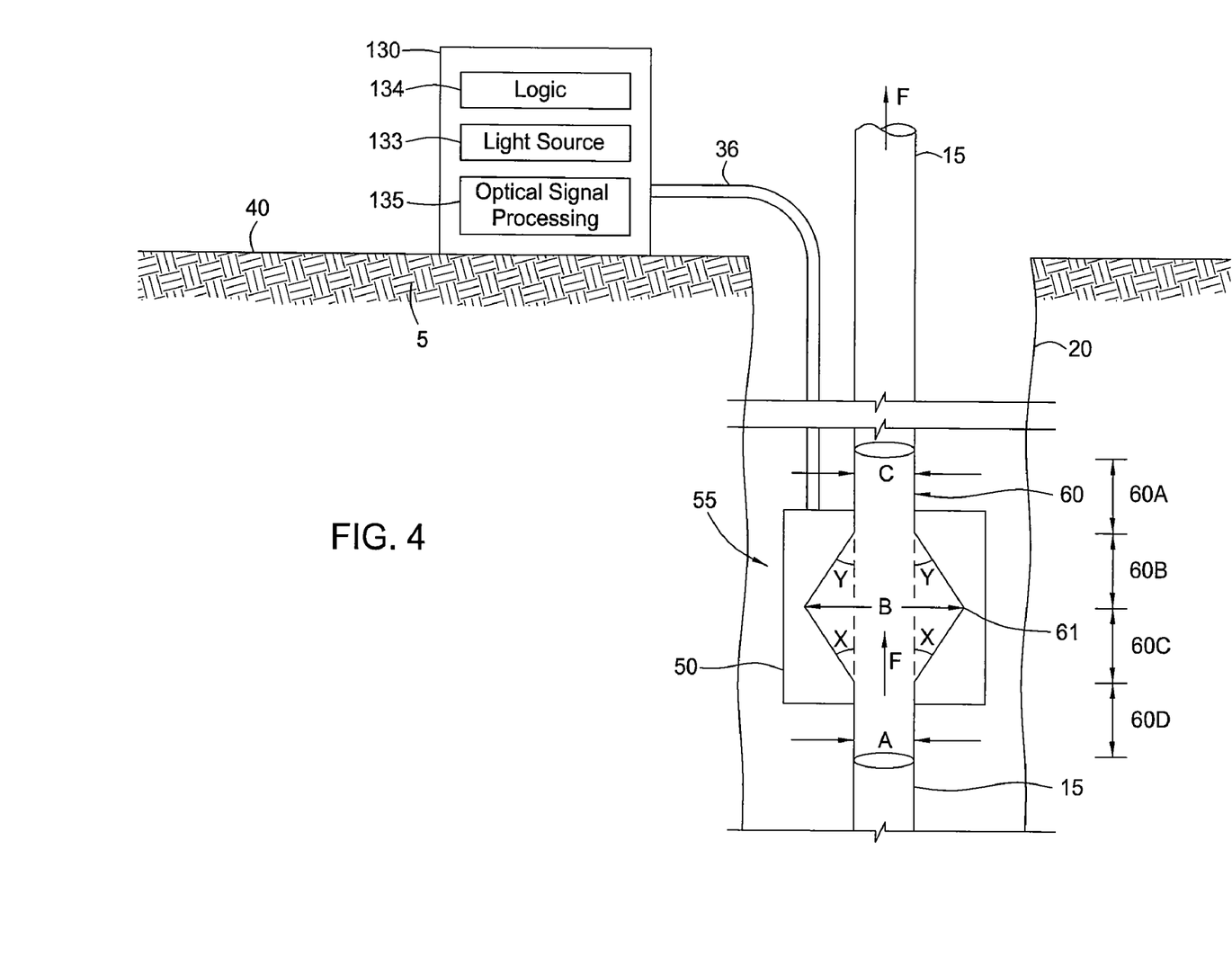
FIG. 4 is a sectional view of an alternate embodiment of the flow rate measurement system of the present invention. A fiber optic differential pressure sensor measures pressure across a flow meter according to the present invention.

FIG. 4 shows an alternate embodiment of the present invention using a fiber optic sensor. Like parts in FIG. 4 are labeled with like numbers to FIG. 2. In this embodiment, the differential pressure sensor 50 is a fiber optic sensor, which satisfies the requirement of a high resolution differential pressure sensor 50. The signal line(s) 36 is a fiber optic cable or line, and the fiber optic or optical cable 36 is connected at one end to the fiber optic sensor 50 and at the other end to control circuitry 130, which includes optical signal processing equipment 135 and logic 134 as well as a light source 133. The control circuitry 130 converts the signal relayed through the fiber optic line 36 to meaningful flow rate data and delivers signal light through the fiber optic line 36.

For some embodiments, the fiber optic sensors may utilize strain-sensitive Bragg gratings (not shown) formed in a core of one or more optical fibers or other wave guide material (not shown) connected to or in the signal line 36. A fiber optic sensor is utilized as the differential pressure sensor 50 and therefore becomes a fiber optic differential pressure sensor. Bragg grating-based sensors are suitable for use in very hostile and remote environments, such as found downhole in the wellbore 20.

As illustrated, to interface with fiber optic sensors, the control circuitry 130 includes a broadband light source 133, such as an edge emitting light emitting diode (EELED) or an Erbium ASE light source, and appropriate equipment for delivery of signal light to the Bragg gratings formed within the core of the optical fibers. Additionally, the control circuitry 130 includes appropriate optical signal processing equipment 135 for analyzing the return signals (reflected light) from the Bragg gratings and converting the return signals into data compatible with data produced by the logic circuitry 134.

The operation of the flow measurement system of FIG. 4 is the same as the operation of the flow measurement system of FIG. 2, except that the differential pressure sensor or fiber optic sensor 50 sends a fiber optic signal through the fiber optic cable 36 to the surface for processing with the optical signal processing equipment 135. The optical signal processing equipment 135 analyzes the return signals (reflected light) from the Bragg gratings and converts the return signals into signals compatible with the logic circuitry 134.

In a further alternate embodiment of the present invention, absolute pressure sensors 70 and 75 of FIG. 3 may be fiber optic or optical sensors, which send a signal through the fiber optic cable 36 of FIG. 4 to the control circuitry 130 for surface processing. In this embodiment, the control circuitry 130 may include a broadband light source 133, logic circuitry 134, and appropriate optical signal processing equipment 135, as described above in relation to FIG. 4. The pressure readings from fiber optic sensors 70 and 75 at the two locations are subtracted from one another and placed into the equation above stated to gain flow rate data. As in FIG. 3, the sensors 70 and 75 may alternatively be connected to a single common signal line or cable.

Whether fiber optic sensors are utilized as the differential pressure sensor 50 or the absolute pressure sensors 70 and 75, depending on a specific arrangement, the fiber optic sensors may be distributed on a common one of the fibers or distributed among multiple fibers. The fibers may be connected to other sensors (e.g., further downhole), terminated, or connected back to the control circuitry 130. Accordingly, while not shown, the inverse Venturi meter 60 and/or production tubing string 15 may also include any suitable combination of peripheral elements (e.g., fiber optic cable connectors, splitters, etc.) well known in the art for coupling the fibers. Further, the fibers may be encased in protective coatings, and may be deployed in fiber delivery equipment, as is also well known in the art.

In the embodiments employing fiber optic sensors, fiber optic pressure sensors described in U.S. Pat. No. 6,016,702, entitled "High Sensitivity Fiber Optic Pressure Sensor for Use in Harsh Environments" and issued to Maron on Jan. 25, 2000, which is herein incorporated by reference in its entirety, as well as any pressure sensors described in U.S. Pat. No. 5,892,860, entitled "Multi-Parameter Fiber Optic Sensor for Use in Harsh Environments" and issued to Maron et al. on Apr. 6, 1999, which is herein incorporated by reference in its entirety, may be utilized. The differential pressure sensor may include any of the embodiments described in U.S. patent application Ser. No. 10/393,557, entitled "Optical Differential Pressure Transducer Utilizing a Bellows and Flexure System," filed by Jones et al. on Mar. 21, 2003, which is herein incorporated by reference in its entirety. Any of the fiber optic pressure sensors described in the above-incorporated patents or patent applications is suitable for use with the present invention as the sensors placed within the differential pressure sensor 50 or as absolute pressure sensors 70 and 75.

In all of the above embodiments, multiple inverse Venturi meters 60 having diverging inner diameters at the throat 61 may be employed along the tubing string 15 to monitor flow rates at multiple locations within the wellbore 20. The inverse Venturi meter 60 of the above embodiments may be symmetric or asymmetric in shape across the throat 61, depending upon the divergence angles X and Y and the corresponding lengths of portions 60B and 60C.

While the foregoing is directed to embodiments of the present invention, other and further embodiments of the invention may be devised without departing from the basic scope thereof, and the scope thereof is determined by the claims that follow.

The invention claimed is:

1. A meter for measuring flow rate of a fluid, comprising:
a tubing forming a body of the meter and having a middle portion between first and second portions, wherein the middle portion defines a larger inner diameter relative to the first and second portions; and
a quartz pressure sensor coupled to the tubing that has a maximum of two pressure ports for sensing pressure of the fluid in the meter, wherein the quartz pressure sensor is coupled to at least one of a first of the two pressure ports disposed at the first portion and a second of the two pressure ports disposed at the middle portion.

2. The meter of claim 1, wherein the quartz pressure sensor is a differential pressure sensor coupled to both of the ports and having a differential pressure resolution of 0.001 psid.

3. The meter of claim 1, wherein the quartz pressure sensor includes first and second absolute pressure sensors respectively coupled to the first and second ports and having a differential pressure resolution of 0.001 psid.

4. The meter of claim 1, wherein the first port is upstream of the second port.

5. The meter of claim 1, wherein the second port is upstream of the first port.

6. The meter of claim 1, wherein the first and second portions define inner diameters that diverge to the larger inner diameter.

7. A meter for measuring flow rate of a fluid, comprising:
a tubing forming a body of the meter and having a middle portion between first and second portions, wherein the middle portion defines a larger inner diameter relative to the first and second portions; and
an electronic pressure sensor coupled to the tubing that has a maximum of two pressure ports for sensing pressure of the fluid in the meter, wherein the pressure sensor is coupled to at least one of a first of the two pressure ports disposed at the first portion and a second of the two pressure ports disposed at the middle portion.

8. The meter of claim 7, wherein the pressure sensor comprises a piezoelectric sensor.

9. The meter of claim 7, wherein the pressure sensor is a differential pressure sensor coupled to both of the ports and having a differential pressure resolution of 0.001 psid.

10. The meter of claim 7, wherein the pressure sensor includes first and second absolute pressure sensors respectively coupled to the first and second ports and having a differential pressure resolution of 0.001 psid.

11. The meter of claim 7, wherein the first port is upstream of the second port.

12. The meter of claim 7, wherein the second port is upstream of the first port.

13. The meter of claim 7, wherein the first and second portions define inner diameters that diverge to the larger inner diameter.

14. A method of determining the flow rate of a fluid through a tubing, comprising:
providing a meter with a body formed by the tubing that has a middle portion between first and second portions, wherein the middle portion defines a larger inner diameter relative to the first and second portions;
measuring only one pressure differential of the fluid in the meter, wherein the pressure differential occurs between the first portion and the middle portion utilizing an electronic pressure sensor; and
determining the flow rate of the fluid using the pressure differential.

15. The method of claim 14, wherein the pressure sensor comprises a quartz sensor.

16. The method of claim 14, wherein measuring the pressure differential with the quartz sensor achieves a differential pressure resolution of 0.001 psid.

17. The method of claim 14, wherein the pressure sensor comprises a piezoelectric sensor.

18. The method of claim 14, wherein the pressure sensor comprises a differential pressure sensor.

19. The method of claim 14, further comprising locating the tubing in a well bore.

* * * * *